(12) United States Patent
Fukao et al.

(10) Patent No.: US 8,752,450 B2
(45) Date of Patent: Jun. 17, 2014

(54) BICYCLE COMPONENT OPERATING DEVICE

(75) Inventors: Kazutaka Fukao, Osaka (JP); Yoshimitsu Miki, Osaka (JP); Kazunori Ookubo, Osaka (JP)

(73) Assignee: Shimano Inc., Osaka (JP)

( * ) Notice: Subject to any disclaimer, the term of this patent is extended or adjusted under 35 U.S.C. 154(b) by 178 days.

(21) Appl. No.: 13/159,455

(22) Filed: Jun. 14, 2011

(65) Prior Publication Data

US 2012/0318095 A1   Dec. 20, 2012

(51) Int. Cl.
*F16C 1/10* (2006.01)

(52) U.S. Cl.
USPC ........................................... 74/502.2

(58) Field of Classification Search
USPC .................. 74/488, 489, 500.5, 501.6, 502.2
See application file for complete search history.

(56) References Cited

U.S. PATENT DOCUMENTS

| | | | | |
|---|---|---|---|---|
| 5,257,683 | A | * | 11/1993 | Romano ...................... 192/217 |
| 6,161,448 | A | * | 12/2000 | Wang .......................... 74/502.2 |
| 6,502,477 | B1 | * | 1/2003 | Assel .......................... 74/502.2 |
| 6,651,523 | B2 | * | 11/2003 | Chou ........................... 74/502.2 |
| 6,718,843 | B2 | | 4/2004 | Campagnolo |
| 7,100,471 | B2 | * | 9/2006 | Irie et al. ...................... 74/502.2 |
| 7,526,979 | B2 | | 5/2009 | Tsumiyama |
| 7,665,384 | B2 | | 2/2010 | Sato et al. |
| 7,703,350 | B2 | * | 4/2010 | Fujii ............................ 74/501.6 |
| 2002/0124679 | A1 | | 9/2002 | Dal Pra |
| 2004/0144193 | A1 | | 7/2004 | Sato et al. |
| 2006/0189423 | A1 | | 8/2006 | Ichida et al. |
| 2006/0207375 | A1 | | 9/2006 | Jordan et al. |
| 2006/0213311 | A1 | | 9/2006 | Ose |
| 2007/0137384 | A1 | | 6/2007 | Kawakami |
| 2007/0137388 | A1 | | 6/2007 | Dal Pra |
| 2008/0087126 | A1 | | 4/2008 | Oda et al. |
| 2008/0196537 | A1 | | 8/2008 | Dal Pra' |
| 2008/0295638 | A1 | | 12/2008 | Miki et al. |
| 2009/0031846 | A1 | | 2/2009 | Dal Pra' et al. |
| 2009/0114051 | A1 | | 5/2009 | Miki |

(Continued)

FOREIGN PATENT DOCUMENTS

| | | | |
|---|---|---|---|
| JP | 62-161097 U | 10/1987 | |
| JP | 03028093 A | * 2/1991 | ............ B62M 25/04 |

OTHER PUBLICATIONS

European Search Report of corresponding EP Application. No. 11 16 2795.6 dated Jul. 10, 2012.

(Continued)

*Primary Examiner* — Vicky Johnson
(74) *Attorney, Agent, or Firm* — Global IP Counselors (57) ABSTRACT

A bicycle component operating device is provided with a base member, an operating lever and an operating unit. The base member includes an insertion opening that is provided on one of a top surface and a bottom surface of the base member to provide access to an interior space within the base member. The operating lever is pivotally mounted on the base member about a first pivot axis extending transverse to the lateral surfaces. The operating unit is disposed in the interior space of the base member. The operating unit has a dimension relative to the insertion opening such that the operating unit is insertable into the interior space of the base member through the insertion opening. The base member is configured such that the insertion opening continuously extends from the first pivot axis toward the first end and the second end with respect to the first pivot axis.

17 Claims, 11 Drawing Sheets

(56) References Cited

U.S. PATENT DOCUMENTS

2011/0132123 A1 6/2011 Tsai et al.
2012/0318094 A1* 12/2012 Fukao et al. .................. 74/502.2
2012/0318096 A1* 12/2012 Fukao et al. .................. 74/502.2

OTHER PUBLICATIONS

Chinese Office Action of corresponding Chinese Application No. 201110099917.8 dated Feb. 28, 2014.

* cited by examiner

BICYCLE COMPONENT OPERATING DEVICE

BACKGROUND

1. Field of the Invention

This invention generally relates to a bicycle component operating device. More specifically, the present invention relates to a bicycle component operating device that has an operating unit disposed within an interior space of a bracket.

2. Background Information

Bicycle component operating devices are used to control various components of a bicycle. There are many types of bicycle component operating device that are currently available. In the past, most bicycle component operating devices used wire type control cables such a Bowden type cable that has an outer case and an inner wire. However, in more recent years, hydraulic bicycle component operating devices and electrical bicycle component operating devices have been developed for controlling various bicycle components. Two of the most common examples of bicycle component operating devices are brake operating devices and shift operating devices.

SUMMARY

One aspect of the present disclosure is to provide a new bicycle operating device that permits a large operating unit to be inserted into a bracket of the bicycle operating device without reducing strength of the bracket.

In view of the state of the known technology, a bicycle operating device is provided that basically comprises a base member, an operating lever and an operating unit. The base member includes a first end with a bicycle mounting structure, a second end spaced from the first end, a top surface extending between the first end and the second end, a bottom surface being opposite to the top surface, a pair of oppositely facing lateral surfaces extending between the top and bottom surfaces. An insertion opening is provided on one of the top and bottom surfaces to provide access to an interior space within the bracket. The operating lever is pivotally mounted on the base member about a first pivot axis extending transverse to the lateral surfaces. The operating unit is disposed in the interior space of the base member. The operating unit has a dimension relative to the insertion opening such that the operating unit is insertable into the interior space of the base member through the insertion opening. The base member is configured such that the insertion opening continuously extends from the first pivot axis toward the first end and the second end with respect to the first pivot axis.

Various objects, features, aspects and advantages of the present disclosure will become apparent to those skilled in the art from the following detailed description, which, taken in conjunction with the annexed drawings, discloses two embodiments of a bicycle component operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
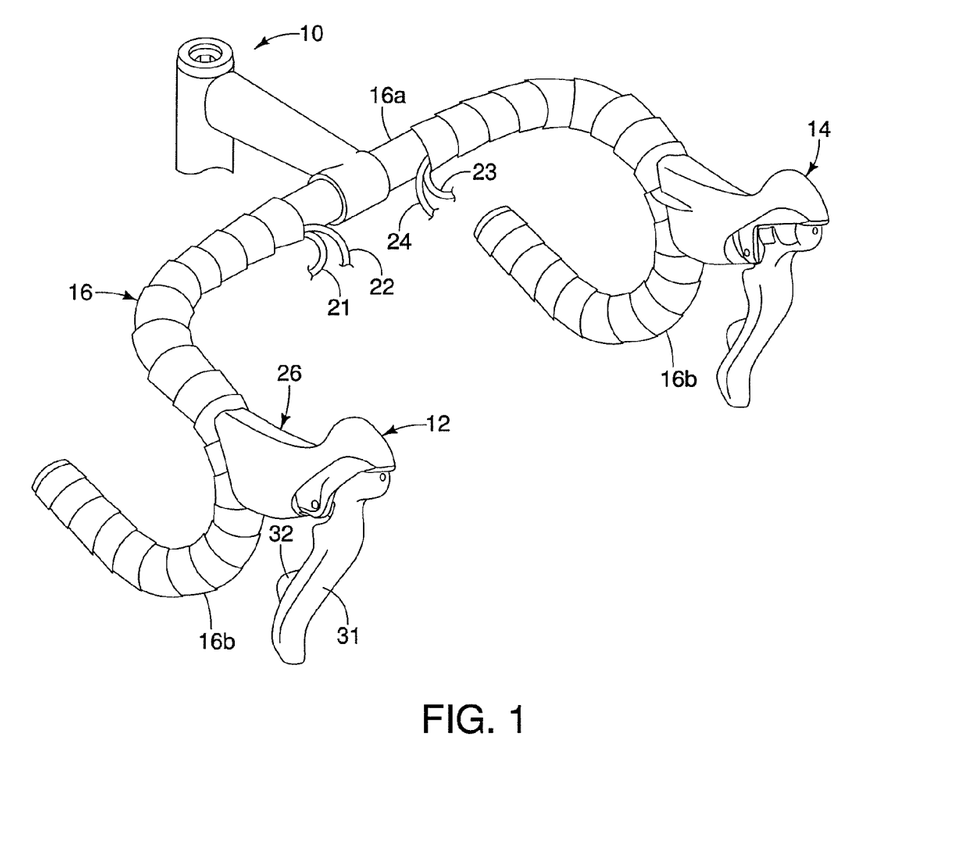
FIG. 1 is a front perspective view of a portion of a bicycle equipped with a pair of bicycle component operating devices coupled to a drop type handlebar in their installed positions in accordance with a first embodiment.

Referring initially to FIG. 1, a portion of a bicycle 10 that is equipped with a pair of bicycle component operating devices 12 and 14 is illustrated. The bicycle component operating devices 12 and 14 are mounted on a drop down handlebar 16 in accordance with the illustrated embodiments as seen in FIG. 1. The bicycle component operating device 12 is a right hand side control device operated by the rider's right hand to operate a first brake device (not shown) and a first gear shifting device (not shown, e.g., a cable operated rear derailleur). The bicycle component operating device 14 is a left hand side control device operated by the rider's left hand to operate a second brake device (not shown) and a second gear shifting device (not shown, e.g., a cable operated front derailleur). The first and second gear shifting devices are part of a conventional bicycle driving system that is used to shift a bicycle chain for changing speeds of the drive train in a relatively conventional manner. In the illustrated embodiment, the bicycle component operating device 12 is operatively coupled to the first gear shifting device via a shift control cable 21 and the first brake device via a brake control cable 22. The bicycle component operating device 14 is operatively coupled to the second gear shifting device via a shift control cable 23 and the second brake device via a brake control cable 24.

Figure 2:
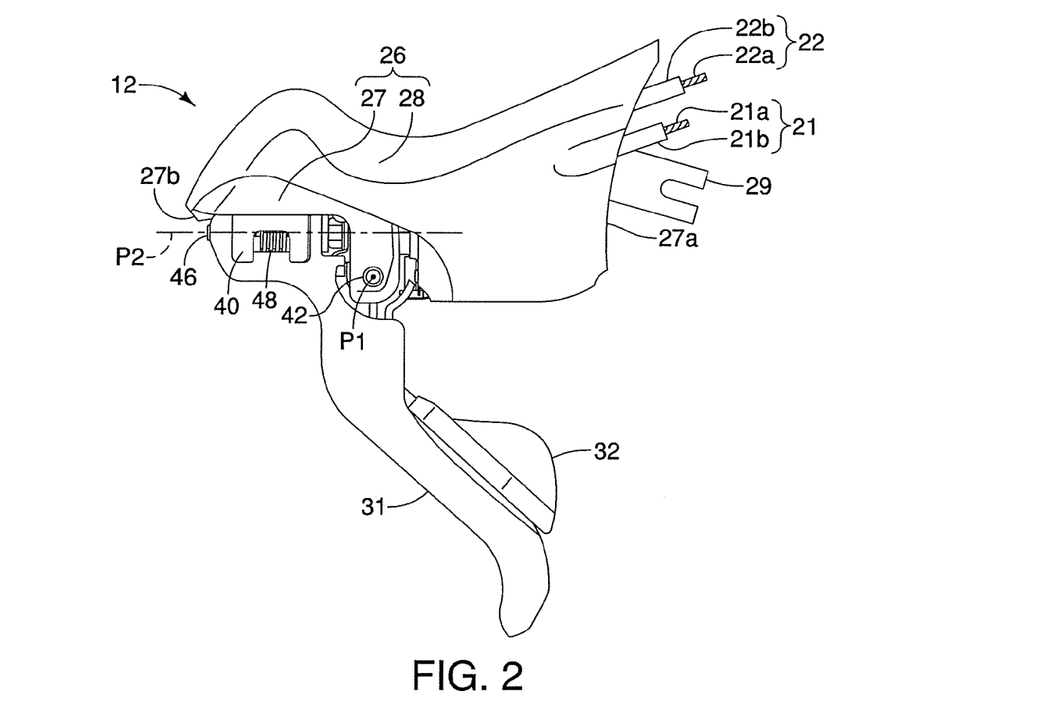
FIG. 2 is an inside elevational view of the right hand side shift operating devices illustrated in FIG. 1 with the brake/shift operating lever and the shift (release) lever in their rest positions.
Figure 3:
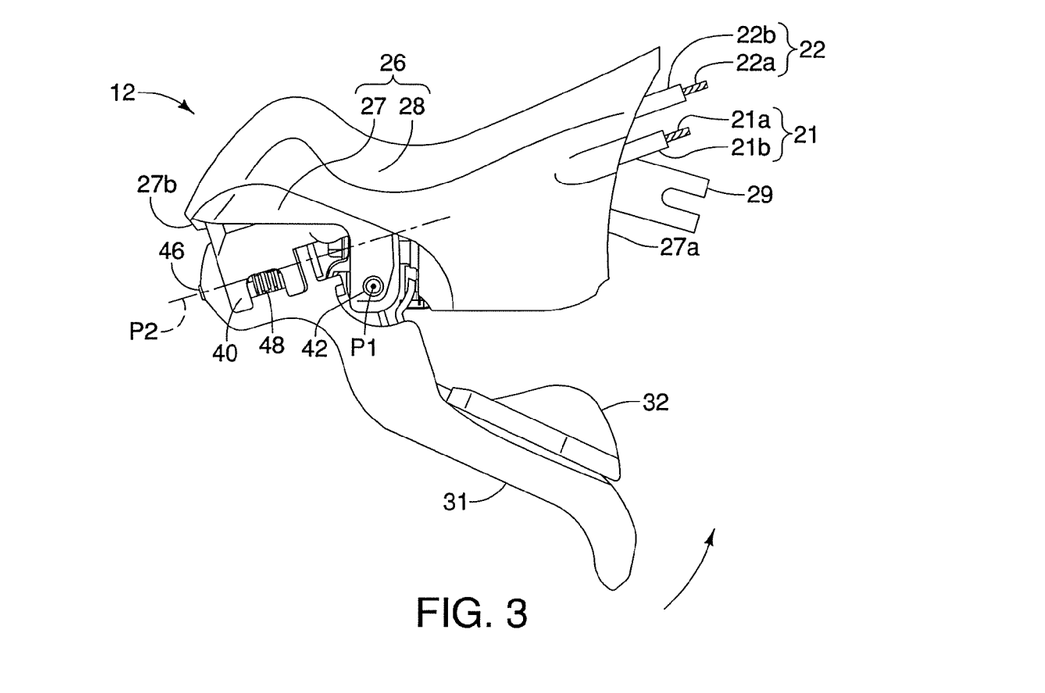
FIG. 3 is an inside elevational view of the right hand side shift operating device illustrated in FIG. 3 with the brake/shift operating lever pivoted to a braking position.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 2 and 3, the shift control cable 21 has an inner wire 21a with an outer case 21b covering the inner wire 21 a, while the brake control cable 22 has an inner wire 22a with an outer case 22b covering the inner wire 22a. The inner wire 21a constitutes a connecting member that operatively connects the bicycle component operating device 12 to the first gear shifting device for shifting the first gear shifting device in response to operation of the bicycle component operating device 12.

In the illustrated embodiment, the right and left hand side bicycle shift operating devices 12 and 14 are essentially identical in operation, except that they are mirror images of each other and they may have a different number of shift operations. Thus, only the right hand side bicycle shift operating device 12 will be discussed and illustrated herein.

As seen in FIG. 1, normally, the gripping portions of the drop down handlebar 16 and portions of the control cables 21 and 22 are covered by the bar tape. The drop down handlebar 16 typically includes a straight cross portion 16a and a pair of downwardly curved portions 16b. The straight cross portion 16a connects upper ends of the downwardly curved portions 16b. The shift operating devices 12 and 14 are mounted to the downwardly curved portions 16b of the drop down handlebar 16. In the illustrated embodiment, the bicycle shift operating device 12 is mounted on the right hand side of the drop down handlebar 16 for operating the first gear shifting device and the bicycle shift operating device 14 is mounted on the left hand side of the drop down handlebar 16 for operating the second gear shifting device. However, each of the shift operating devices 12 and 14 can be manufactured as a mirror of the illustrated embodiment, such that the shift operating devices 12 and 14 can be mounted on opposite sides of the drop down handlebar 16.

While the bicycle component operating devices 12 and 14 are illustrated as bicycle component operating device that combine both shifting and braking using Bowden type cables, the bicycle component operating devices 12 and 14 are not limited to bicycle component operating device that combine both shifting and braking using Bowden type cables. For example, the bicycle component operating devices 12 and 14 can be configured for performing only shifting or only braking. Also the bicycle component operating devices 12 and 14 can be configured for performing braking using a hydraulic operating unit, with or without a shifting unit.

As seen in FIGS. 2 and 3, the bicycle shift operating device 12 includes a bracket 26. The bracket 26 has a base member 27 and a grip cover 28. Typically, the base member 27 is made of a rigid, hard plastic material. Riders sometimes grip the bracket 26 and lean on the bracket 26 during riding. It is desirable to provide a comfortable feeling for the rider's hand while the rider is gripping the bracket 26. Thus, the grip cover 28 is made of elastic material such as rubber. The grip cover 28 is stretched over a gripping portion of the base member 27. The base member 27 has a first end 27a with a handlebar mounting structure 29 for fixedly mounting the bracket 26 to one of the curved portions 16b of the drop down handlebar 16 (FIG. 1). The handlebar mounting structure 29 is preferably a conventional band clamp or similar structure that is used in a road shifter for mounting to a drop down style handlebar such as the drop down handlebar 16. Thus, the handlebar mounting structure 29 will not be discussed in detail herein. The base member 27 has a second end 27b that is spaced from the first end 27a. Since the base member 27 is fixed to the drop down handlebar 16 by the handlebar mounting structure 29, the bracket 26 constitutes a fixed member. A top surface 27c of the main body 27 extends between the first and second ends 27a and 27b. A bottom surface 27d of the base member 27 faces in an opposite direction from the top surface 27c. The base member 27 also has a pair of oppositely facing lateral surfaces 27e and 27f. The lateral surfaces 27e and 27f extend between the top and bottom surfaces 27c and 27d. The lateral surfaces 27e and 27f are defined by the side surfaces of the base member 27 that are visible as viewed in a lateral side elevation (e.g., FIGS. 2 and 3 for the lateral surface 270 with the bicycle shift operating device 12 installed on the drop down handlebar 16 and with the bicycle 10 on level ground in an upright position. Each of the lateral surfaces 27e and 27f includes has a pair of pivot attachment portions 27g and 27h respectively. The pivot attachment portions 27g and 27h are disposed at the lateral surfaces of the base member 27. The top and bottom surfaces 27c and 27d of the base member 27 are defined by the top and bottom plan surfaces of the base member 27, respectively, that are not visible as viewed in a lateral side elevation (e.g., FIGS. 2 and 3) with the bicycle shift operating device 12 installed on the drop down handlebar 16 and with the bicycle 10 on level ground in an upright position.

In this embodiment, as best seen in FIGS. 2 to 8, the bicycle shift operating device 12 further includes a shift operating unit 30, a brake/shift operating lever 31 (e.g., a first operating lever) and a shift operating lever 32 (e.g., a second operating lever). The base member 27 of the bracket 26 houses the shift operating unit 30 in an interior space or cavity 33 of the base member 27. The brake/shift operating lever 31 and the shift operating lever 32 are examples of user operated levers used for operating the shift operating unit 30 as discussed below. The brake/shift operating lever 31 and the shift operating lever 32 are both movable with respect to the bracket 26 to operate the shift operating unit 30. In the illustrated embodiment, the brake/shift operating lever 31 and the shift operating lever 32 are biased to the rest positions in a conventional manner. The term "rest position" as used herein refers to a state in which the part (e.g., the brake/shift operating lever 31 and the shift operating lever 32) remains stationary without the need of a user holding the part in that state corresponding to the rest position.

Figure 4:
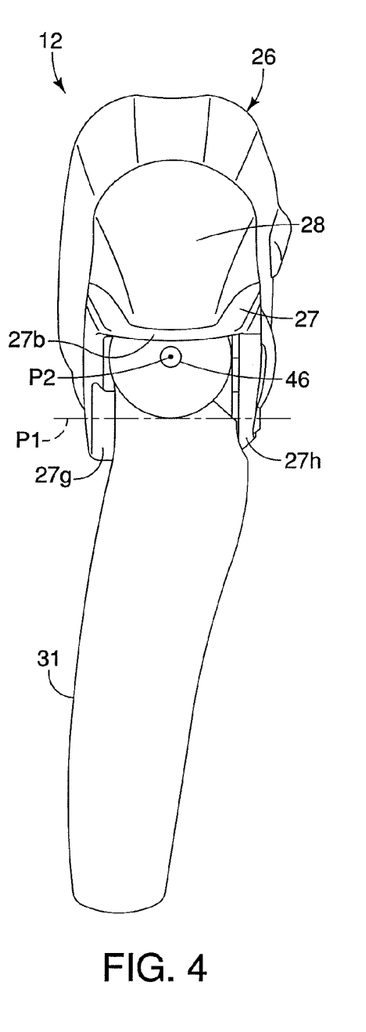
FIG. 4 is a front elevational view of the right hand side shift operating device illustrated in FIGS. 1 to 3 with the brake/shift operating lever and the shift (release) lever in their rest positions.
Figure 5:
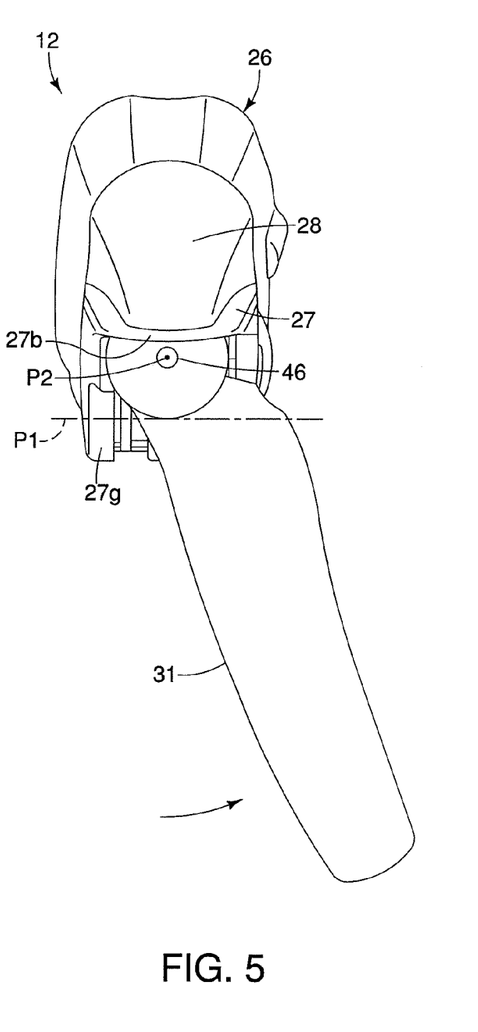
FIG. 5 is a front elevational view of the right hand side shift operating device illustrated in FIG. 4, but with the brake/shift operating lever of the right hand side shift operating device moved to a cable winding position.

As seen in FIGS. 2 to 5, the brake/shift operating lever 31 is used to perform both a braking operation and a shifting operation. FIGS. 2 and 4 illustrate the brake/shift operating lever 31 in the rest position. FIG. 3 illustrates the brake/shift operating lever 31 in a braking position, while FIG. 5 illustrates the brake/shift operating lever 31 in a shift operating position. The brake/shift operating lever 31 functions as a brake lever and a cable pulling lever. The brake/shift operating lever 31 is pivotally mounted relative to the base member 27 of the bracket 26 about a brake pivot axis P1 that extends transverse to the lateral surfaces 27e and 27f of the base member 27. The brake/shift operating lever 31 is also pivotally mounted relative to the base member 27 of the bracket 26 about a shift pivot axis P2 along a plane that is transverse to a braking plane of brake/shift operating lever 31.

As seen in FIGS. 2 and 3, the brake/shift operating lever 31 functions as a brake lever by the rider pivoting the brake/shift operating lever 31 about the brake pivot axis P1 relative to the base member 27 of the bracket 26 towards the curved portion 16b of the handlebar 16. This pivotal movement of the brake/shift operating lever 31 from the rest position to the braking position along a non-shift operating path pulls the inner wire 22a of the brake cable 22 to operate a first brake device. The shift operating unit 30 remains stationary as the brake/shift operating lever 31 pivots with respect to the base member 27 from the rest position to the braking position during a braking operation. As seen in FIGS. 4 and 5, the brake/shift operating lever 31 pulls the inner wire 21a of the shift cable 21 into the shift operating unit 30 by pivoting the brake/shift operating lever 31 about the shift pivot axis P2 relative to the base member 27 of the bracket 26 towards a center longitudinal plane of the bicycle 10. Thus, the brake/shift operating lever 31 constitutes as a cable pulling lever.

Figure 6:
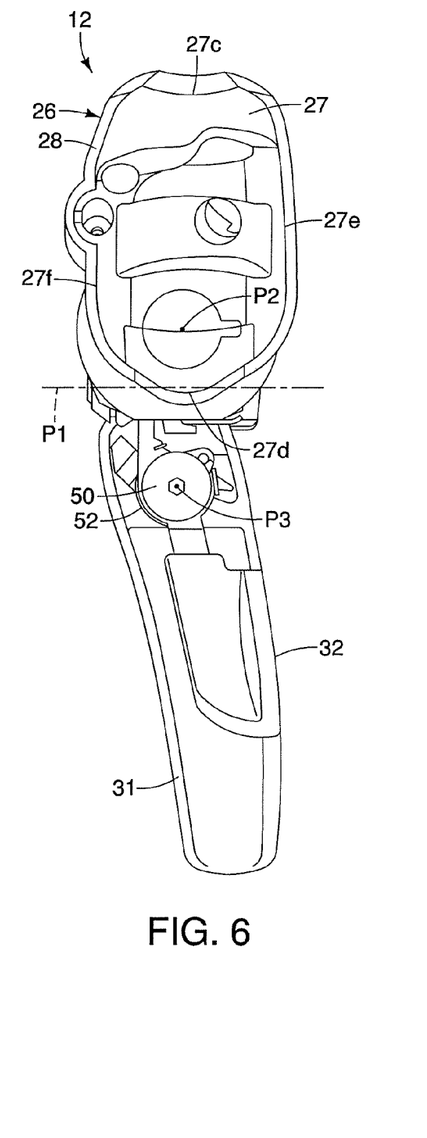
FIG. 6 is a rear elevational view of the right hand side shift operating device illustrated in FIGS. 4 and 5 with the brake/shift operating lever and the shift (release) lever in their rest positions.
Figure 7:
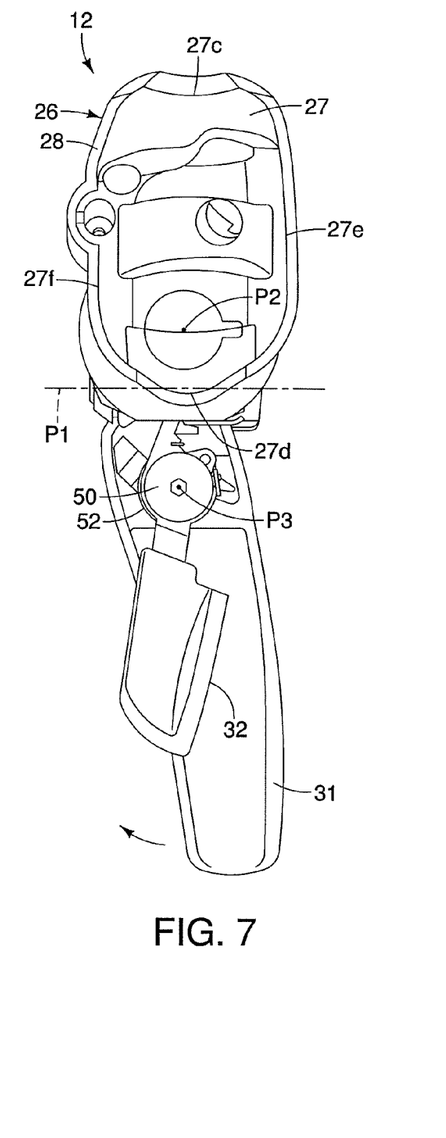
FIG. 7 is a rear elevational view of the right hand side shift operating device illustrated in FIG. 6, but with the shift (release) lever moved to a cable releasing position.

As seen in FIGS. 6 and 7, the shift operating lever 32 is pivotally mounted on the brake/shift operating lever 31 such that the shift operating lever 32 pivots relative to the brake/shift operating lever 31. The shift operating lever 32 only performs a shifting operation (i.e., a cable releasing operation). Thus, the shift operating lever 32 constitutes as a cable releasing lever. FIG. 6 illustrates the shift operating lever 32 in the rest position. FIG. 7 illustrates the shift operating lever 32 in a shift operating position. In particular, the shift operating lever 32 is pivotally mounted on the brake/shift operating lever 31 such that the shift operating lever 32 pivots relative to the brake/shift operating lever 31 about a shift pivot axis P3 between the rest position and the shifting position. The brake/shift operating lever 31 and the shift operating lever 32 are arranged such that the shift pivot axes P2 and P3 are offset. In the illustrated embodiment, the shift operating lever 32 releases the inner wire 21a from the shift operating unit 30 by pivoting the shift operating lever 32 about the shift pivot axis P3 towards the center longitudinal plane of the bicycle 10. This pivotal movement of the shift operating lever 32 operates the shift operating unit 30 for performing a cable releasing operation of the shift operating unit 30 to operate the first shifting device. In the illustrated embodiment, the shift operating lever 32 moves with the brake/shift operating lever 31 as the brake/shift operating lever 31 is moved to perform braking operations and shifting operations as shown in FIGS. 3 and 5. However, the brake/shift operating lever 31 generally remains stationary during movement of the shift operating lever 32 to perform shifting operations as seen in FIG. 7.

Figure 9:
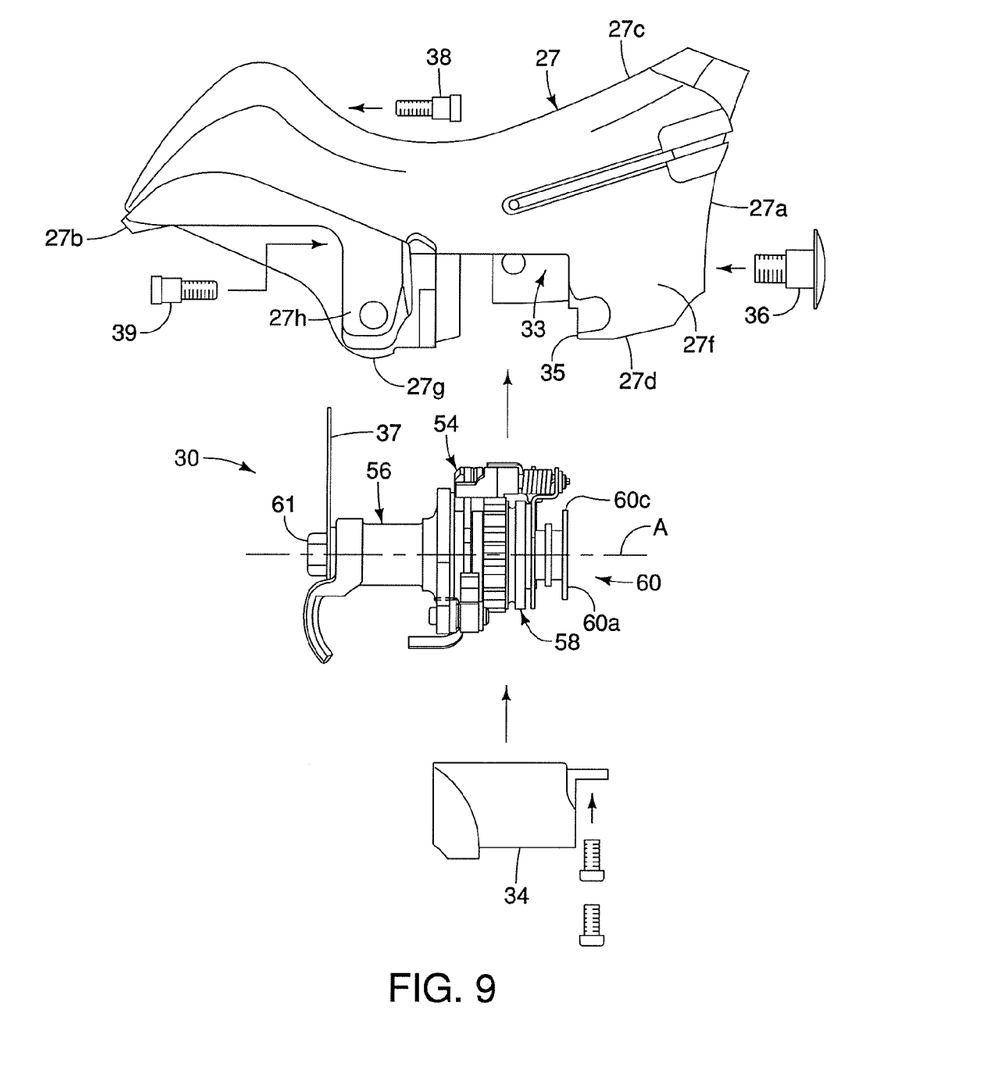
FIG. 9 is an exploded, side elevational view of the base member and the shift operating unit showing installation of the shift operating unit into the base member.
Figure 10:
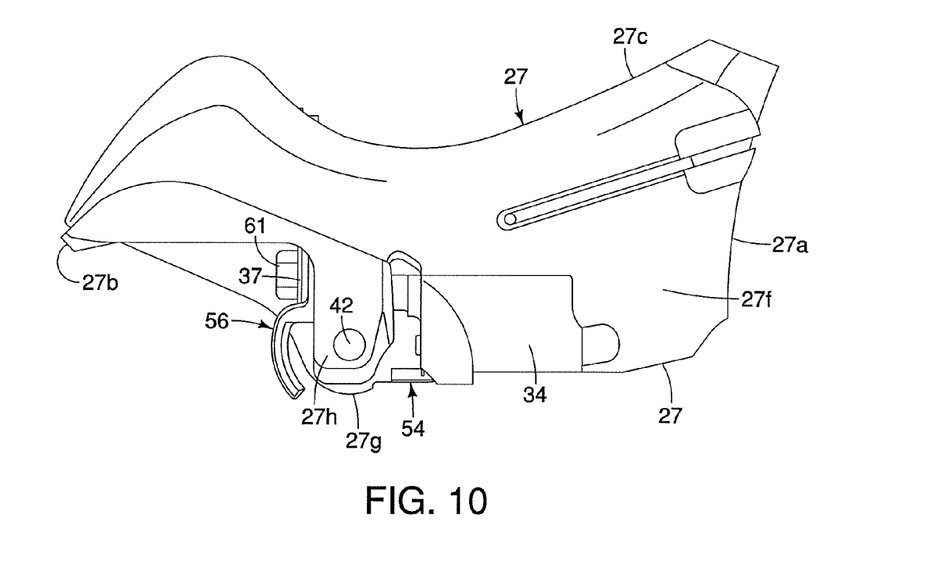
FIG. 10 is a side elevational view of the base member and the shift operating unit with the bottom access cover installed over a potion of the insertion opening of the base member.
Figure 11:
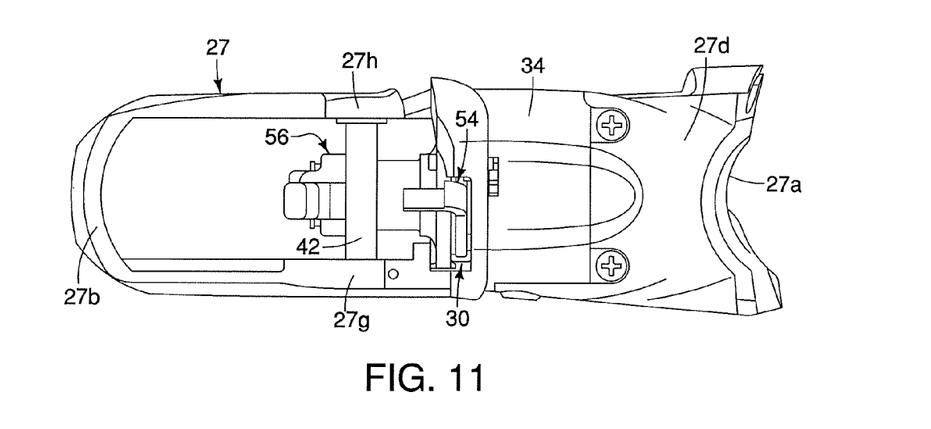
FIG. 11 is a bottom plan view of the base member and the shift operating unit with the bottom access cover installed over a potion of the insertion opening of the base member.
Figure 12:
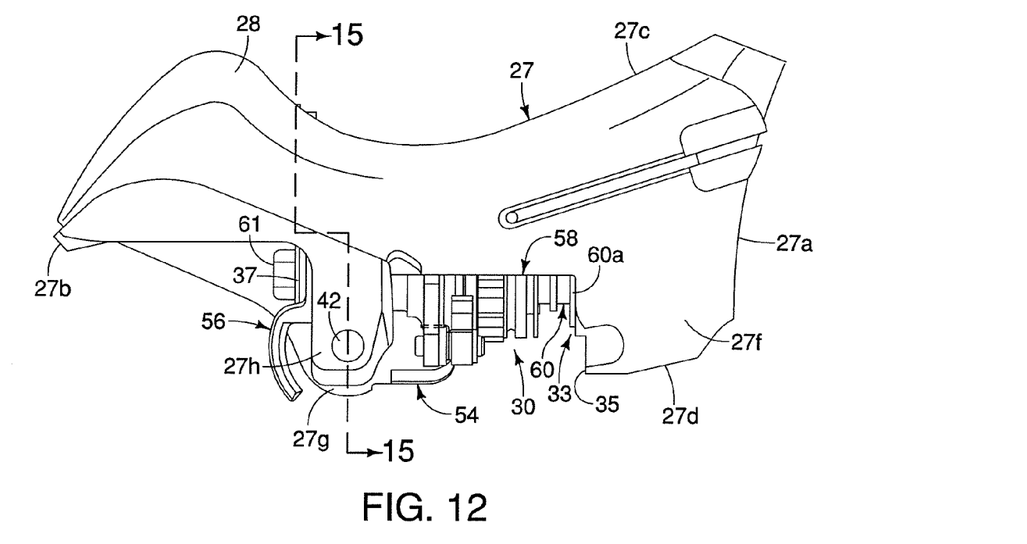
FIG. 12 is a side elevational view of the base member and the shift operating unit with the bottom access cover removed to show the shift operating unit installed in the base member.
Figure 13:
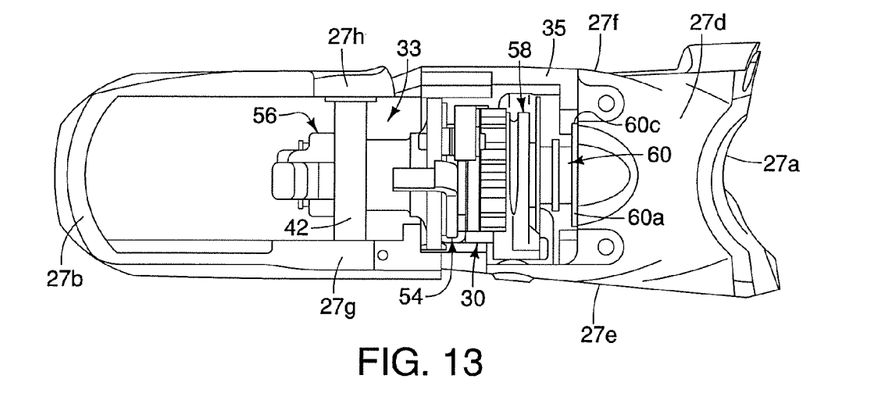
FIG. 13 is a bottom plan view of the base member and the shift operating unit with the bottom access cover removed to show the shift operating unit installed in the base member.

As seen in FIGS. 9 to 11, the base member 27 of the bracket 26 is provided with an access cover 34. The access cover 34 is removably attached to the base member 27 and at least partially closing an insertion opening 35. The insertion opening 35 is provided on the bottom surface 27d for providing access into the interior space 33 of the base member 27 of the bracket 26. In the illustrated embodiment, the base member 27 is configured such that the insertion opening 35 continuously extends from the pivot axis P1 toward the first end 27a and the second end 27b with respect to the pivot axis P1. Moreover, the area of the interior space 33 between the pivot attachment portions 27g and 27h is free of any material from the base member 27 such that the insertion opening 35 extends forward between the pivot attachment portions 27g and 27h.

Thus, the insertion opening 35 extends the majority of the length of the bottom surface 27d of the base member 27. In the illustrated embodiment, the access cover 34 is removably attached to the base member 27 by a pair of fasteners (e.g., screws). Of course, the access cover 34 can be removably attached to the base member 27 in other ways such as a snap-fit arrangement.

Figure 8:
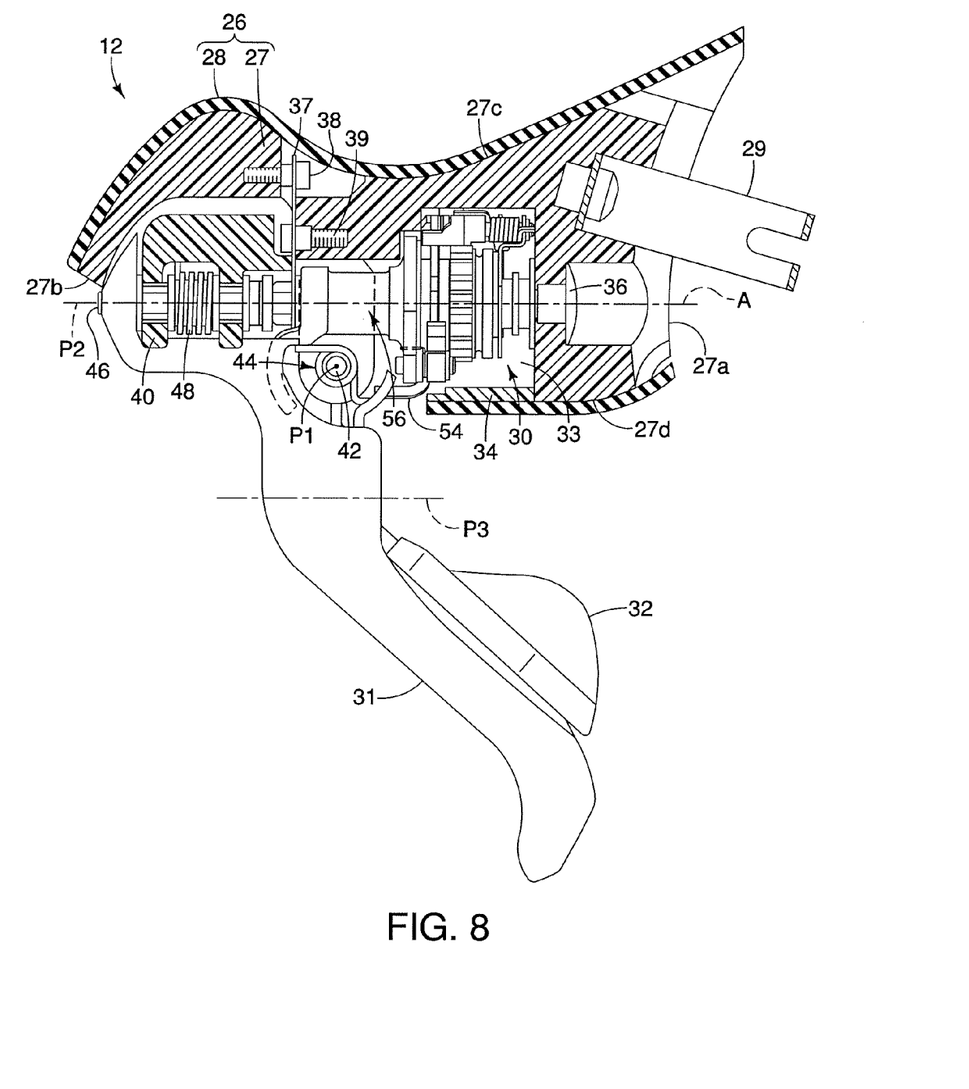
FIG. 8 is a longitudinal cross sectional view of the base member of the right hand side shift operating device with the operating levers and the shift operating unit illustrated in elevation.

As seen in FIG. 8, the first end or rear end of the shift operating unit 30 is attached to the base member 27 of the bracket 26 by a fastening element 36 (e.g., bolt), while the second end or front end of the shift operating unit 30 is attached to the base member 27 of the bracket 26 by a hanger 37 using a pair of fasteners 38 and 39 (e.g., screws). Thus, the shift operating unit 30 is disposed in the bracket 26 in the interior space 33 of the base member 27 between the first and second ends 27a and 27b. The hanger 37 is attached to the base member 27 of the bracket 26 by the first fastener 38 being attached to the base member 27 on a first side of the hanger 37 with respect to a longitudinal direction of the base member 27 and the second fastener 39 being attached to the base member 27 on a second side of the hanger 37 with respect to the longitudinal direction of the base member 27.

Figure 14:
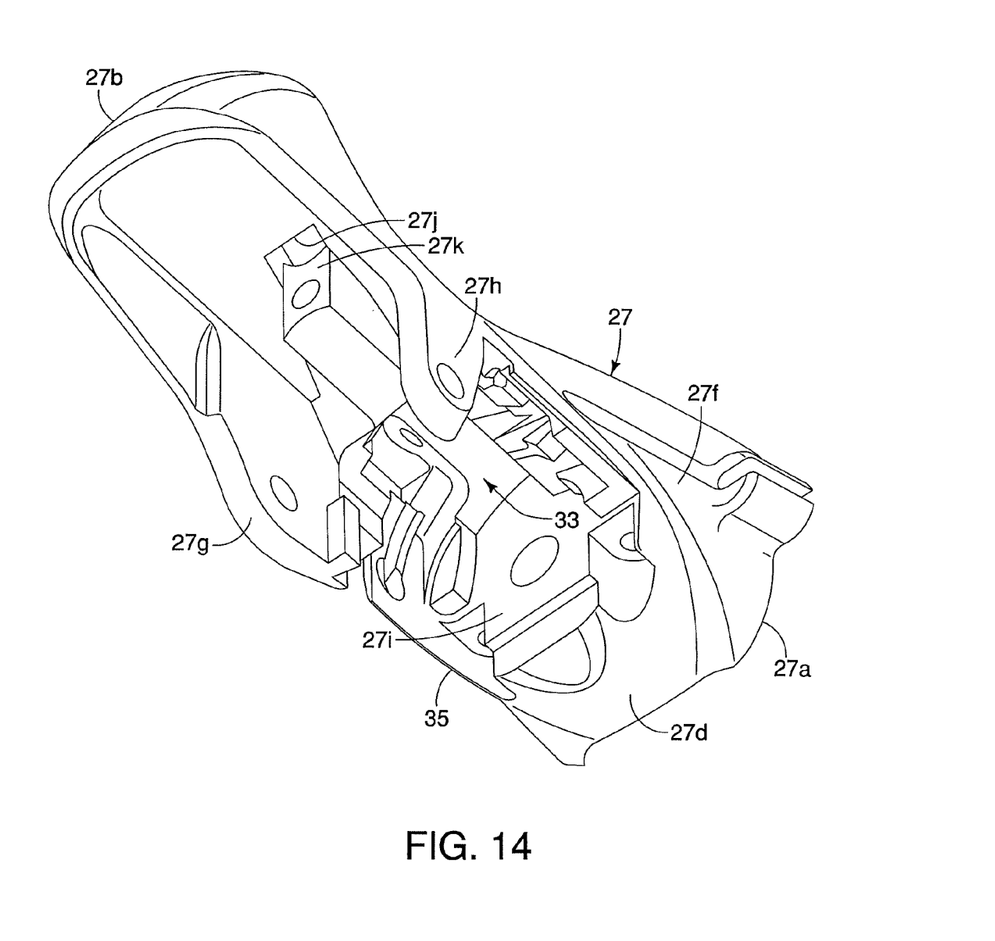
FIG. 14 is a bottom perspective view of the base member.

As seen in FIG. 14, the base member 27 of the bracket 26 has a rear interior surface 27i formed by the first end 27a of the base member 27. The shift operating unit 30 is supported to the rear interior surface 27i by the fastening element 36 (FIG. 8). The rear interior surface 27i partly defines the interior space 33 of the base member 27. The base member 27 further includes a pair of mounting surfaces 27j and 27k with threaded hole for receiving the fasteners 38 and 39, respectively. Thus, the shift operating unit 30 is solely supported to the base member 27 of the bracket 26 at three attachment points formed on the rear interior surface 27i and the mounting surfaces 27j and 27k. Thus, the shift operating unit 30 is not supported by the base member 27 in the area between the rear interior surface 27i and the hanger 37 in a direction toward the insertion opening 35. In other words, with the access cover 34 removed, there is nothing supporting the shift operating unit 30 from falling out of the interior space 33 of the base member 27 via the insertion opening 35 once the fastening element 36 and the fasteners 38 and 39 are removed. This configuration of the base member 27 provides unobstructed access to the interior space 33 of the base member 27 via the insertion opening 35 to install the shift operating unit 30. Also this arrangement configuration of the base member 27 does not compromise the strength of the base member 27 at the pivot attachment portions 27g and 27h even though the insertion opening 35 extends forward of the pivot attachment portions 27g and 27h.

Referring to FIG. 8, the brake/shift operating lever 31 is provided with a support member 40 for movably supporting the brake/shift operating lever 31 and the shift operating lever 32 on the base member 27 of the bracket 26. The support member 40 is pivotally attached to the base member 27 of the bracket 26 by a pivot pin 42 that defines the brake pivot axis P1. The pivot pin 42 is located in holes of the pivot attachment portions 28a of the bracket 26. A biasing element 44 is provided between the base member 27 and the support member 40. The biasing element 44 is arranged for biasing the support member 40 and the brake/shift operating lever 31 to the rest position as seen in FIG. 2. In the illustrated embodiment, the biasing element 44 is a torsion spring with its coiled portion disposed on the pivot pin 42 and its first and second free ends contacting the base member 27 and the support member 40, respectively.

As best seen in FIG. 8, the brake/shift operating lever 31 is pivotally attached to the support member 40 by a pivot pin 46 that defines the shift pivot axis P2. A biasing element 48 is provided between the brake/shift operating lever 31 and the support member 40. The biasing element 48 is arranged for biasing the brake/shift operating lever 31 to the rest position. In the illustrated embodiment, the biasing element 48 is a torsion spring with its coiled portion disposed on the pivot pin 46 and its first and second free ends contacting the brake/shift operating lever 31 and the support member 40, respectively.

As best seen in FIG. 8, the support member 40 constitutes a brake cable attachment structure of the brake/shift operating lever 31 for attaching the inner wire 22a. When the brake/shift operating lever 31 is pivoted about the brake pivot axis P1, the brake/shift operating lever 31 pulls the inner wire 22a relative to the outer case 22b to perform a braking operation. Generally speaking, in performing braking operations, the brake/shift operating lever 31 moves in a longitudinal direction with respect to the bracket 26. In other words, during a braking operation, the brake/shift operating lever 31 moves along a brake operating plane that is substantially perpendicular the shift operating planes of the brake/shift operating lever 31 and the shift operating lever 32. Thus, the brake/shift operating lever 31 moves with respect to the bracket 26 about the brake pivot axis P1 that is perpendicular to the shift pivot axes P2 and P3.

Referring to FIGS. 6 and 7, the shift operating lever 32 is also pivotally mounted to the brake/shift operating lever 31 by a bolt 50 that defines the shift pivot axis P3. The shift pivot axis P3 can be either parallel to the shift pivot axis P2, as illustrated, or angled with respect to the shift pivot axis P2 as viewed in a direction parallel to the brake pivot axis P1. A biasing element 52 is provided between the brake/shift operating lever 31 and the shift operating lever 32 for biasing the shift operating lever 32 to a rest position. In the illustrated embodiment, the biasing element 52 is a torsion spring with its coiled portion disposed on the pivot pin 50 and its first and second free ends contacting the brake/shift operating lever 31 and the shift operating lever 32, respectively.

Figure 15:
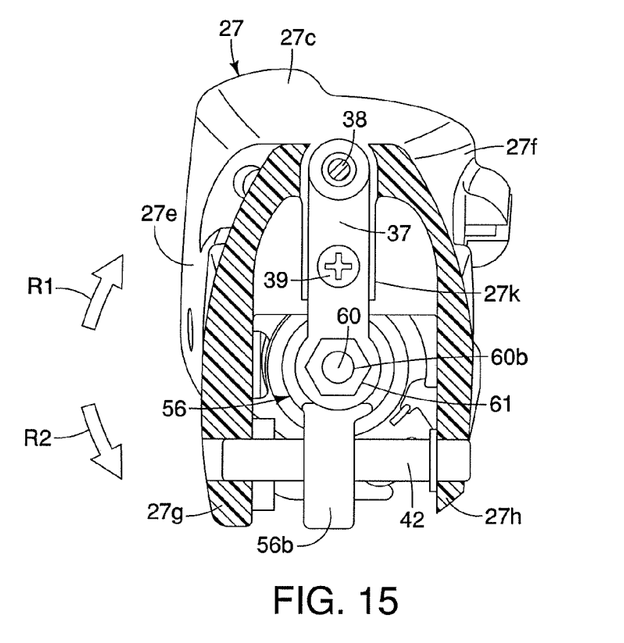
FIG. 15 is a transverse cross sectional view of the base member as seen along section line 15-15 of FIG. 12.
Figure 16:
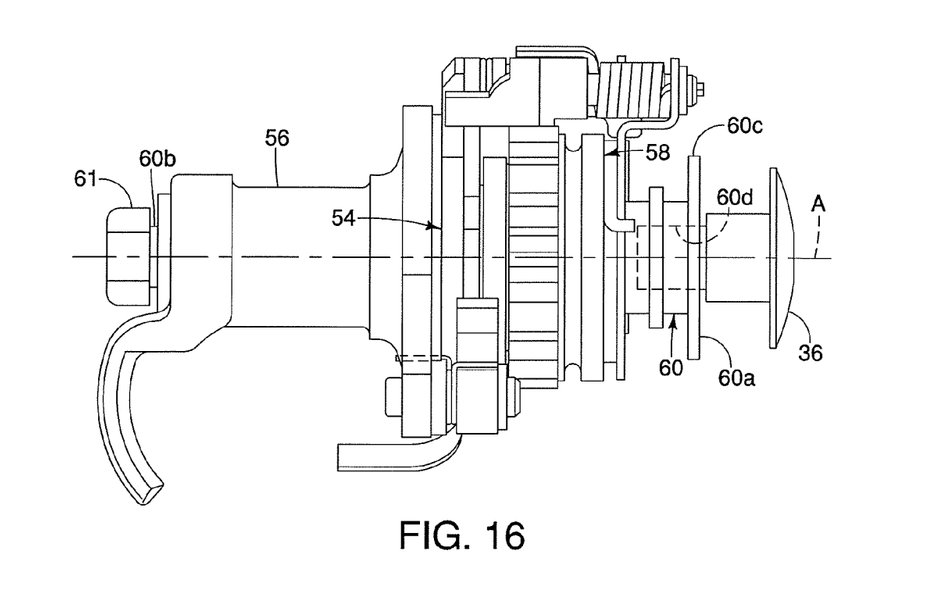
FIG. 16 is a side elevational view of the shift operating unit with the parts in their rest positions.

Turning now to FIGS. 15 and 16, the shift operating unit 30 will now be discussed. The shift operating unit 30 basically includes, among other things, a release member 54, a connecting member 56, a cable take-up member or spool 58 and a shift axle 60. The release member 54 and the connecting member 56 constitute actuating members of the shift operating unit 30. The release member 54 and the connecting member 56 are rotatably mounted on the shift axle 60. The release member 54 operatively connects the shift operating unit 30 to the shift operating lever 32. The connecting member 56 operatively connects the shift operating unit 30 to the brake/shift operating lever 31. In the illustrated embodiment, the connecting member 56 is pivoted in the first rotational direction R1 with respect to a main pivot axis A of the shift operating unit 30 by the brake/shift operating lever 31 to selectively operate the take-up member 58 in a first rotational direction R1 (i.e., a cable pulling direction). In the illustrated embodiment, the release member 54 is pivoted in a second rotational direction R2 with respect to a main pivot axis A of the shift operating unit 30 by the shift operating lever 32 to selectively operate the take-up member 58 in the second rotational direction R2 (i.e., a cable releasing direction).

As seen in FIG. 16, the shift axle 60 defines the overall length of the shift operating unit 30. The shift axle 60 has a first axle end 60a and a second axle end 60b. The first axle end 60a of the shift axle 60 has an annular abutment flange 60c and an internally threaded bore 60d. The second axle end 60b of the shift axle 60 has an external thread for receiving a nut 61 that secures various parts of the shift operating unit 30 on the shift axle 60. Thus, the dimension of the insertion opening 35 is preferably as large as or larger than the axial length the shift axle 60. In this way, the shift operating unit 30 is easy inserted into the interior space 33 of the base member 27 of the bracket 26 through the insertion opening 35. In particular, the insertion opening 35 further has a dimension in a longitudinal direction of the bracket 26 that at least equal to an axial length of the shift axle 60 such that the shift operating unit 30 is insertable into the interior space of the bracket 26 through the insertion opening 35 in a direction perpendicular to the shift axle 60 in an installed position. The first axle end 60a is supported to the base member 27 by the fastening element 36, while the second axle end 60b is supported to the base member 27 by the hanger 37 as discussed above. In particular, the shift axle 60 is detachably secured to the rear interior surface 28b of the first end 27a of the base member 27 by the fastening element 36 and the second axle end 60b is detachably secured to the hanger 37 at a location forward of the brake pivot axis P1.

As seen in FIG. 16, the take-up member 58, the release member 54 and the connecting member 56 are coaxially arranged on the shift axle 60 of the shift operating unit 30. The shift axle 60 defines the main pivot axis A of the shift operating unit 30. The shift axle 60 pivotally supports the release member 54, the connecting member 56 and the take-up member 58 to the bracket 26 for rotation on the main pivot axis A (FIG. 16). As seen in FIG. 8, in the illustrated embodiment, the main pivot axis A is aligned with the shift axis P2 and parallel to the shift axis P3. On the other hand, the shift axis P2 is transversely arranged with respect to the brake pivot axis P1. The shift operating unit 30 includes a cable pulling mechanism and a cable releasing mechanism, which are preferably conventional mechanisms or similar mechanisms that are used in a road shifter for mounting to a drop down style handlebar such as the drop down handlebar 16. Thus, these mechanisms of the shift operating unit 30 will not be discussed in detail herein.

Figure 17:
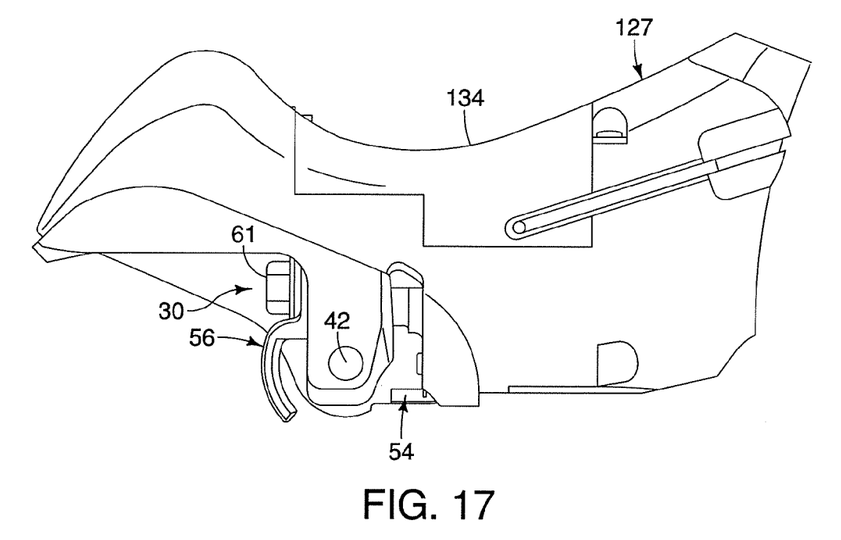
FIG. 17 is a side elevational view of a modified base member with the shift operating unit shown in FIG. 16 installed therein.
Figure 18:
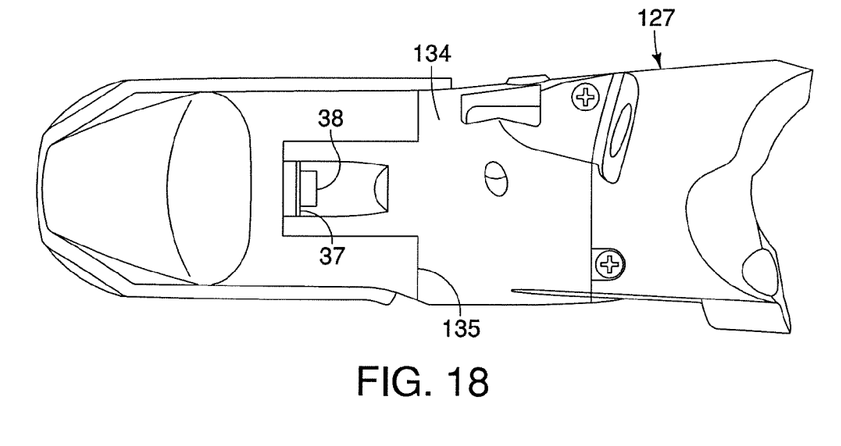
FIG. 18 is a top plan view of the modified base member shown in FIG. 17 with the shift operating unit shown in FIG. 16 installed therein.

Referring now to FIGS. 17 and 18, a modified base member 127 is illustrated that is used with the shift operating unit 30 of FIG. 16. Basically, the modified base member 127 only differs from the base member 27 in that the base member 127 has an insertion opening provided on the top surface of the base member 127 and a top mounted access cover 134 removably attached to the top surface of the base member 127 for closing an insertion opening 135. The access cover 134 is removably attached to the base member 127 and at least partially closing the insertion opening 135 for inserting the shift operating unit 30 into the interior space or cavity of the base member 127. In the second illustrated embodiment, the access cover 134 is removably attached to the base member 127 by a pair of fasteners (e.g., screws). Of course, the access cover 134 can be removably attached to the base member 127 in other ways such as a snap-fit arrangement.

In understanding the scope of the present invention, the term "comprising" and its derivatives, as used herein, are intended to be open ended terms that specify the presence of the stated features, elements, components, groups, and/or integers, but do not exclude the presence of other unstated features, elements, components, groups, and/or integers. The foregoing also applies to words having similar meanings such as the terms, "including", "having" and their derivatives. As used herein to describe the above embodiment(s), the following directional terms "forward", "rearward", "top", "bottom", "above", "below", "downward", "vertical", "horizontal", "inner", "outer" and "transverse" as well as any other similar directional terms refer to those directions of a bicycle equipped with the bicycle component operating device on a flat horizontal surface. Accordingly, these terms, as utilized to describe the bicycle component operating device should be interpreted relative to a bicycle equipped with the bicycle component operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating device comprising:
a base member including a first end with a bicycle mounting structure, a second end spaced from the first end, a top surface extending between the first end and the second end, a bottom surface being opposite to the top surface, a pair of oppositely facing lateral surfaces extending between the top and bottom surfaces, an insertion opening being provided on one of the top and bottom surfaces to provide access to an interior space within the base member;
an operating lever pivotally mounted on the base member about a first pivot axis extending transverse to the lateral surfaces; and
an operating unit disposed in the interior space of the base member and detachably fastened to the base member, the operating unit having a dimension relative to the insertion opening such that the operating unit is insertable into the interior space of the base member through the insertion opening, the operating unit being separate from the operating lever, the operating unit having a connecting member that operatively connects the operating unit to the operating lever,
the base member having a gripping portion that is disposed between the first end and the second end of the base member, the gripping portion being configured and arranged relative to the operating lever to be gripped by a user to operate the operating lever, the base member being further configured such that the insertion opening continuously extends from the first pivot axis toward the first end and the second end with respect to the first pivot axis.

2. The bicycle component operating device according to claim 1, wherein
the insertion opening is provided on the top surface of the base member.

3. The bicycle component operating device according to claim 1, wherein
the insertion opening is provided on the bottom surface of the base member.

4. The bicycle component operating device according to claim 1, further comprising an access cover removably attached to the base member and at least partially closing the insertion opening.

5. The bicycle component operating device according to claim 1, wherein
the base member includes a pair of pivot attachment portions, the operating lever being pivotally mounted on the pivot attachment portions of the base member by a pivot pin, the insertion opening extending forward between the pivot attachment portions, the connecting member of the operating unit extending forward between the pivot attachment portions.

6. The bicycle component operating device according to claim 1, wherein
the operating unit is a shift operating unit that includes a cable take-up member.

7. The bicycle component operating device according to claim 6, wherein
the operating lever is further pivotally mounted relative to the base member to pivot about a second pivot axis that is non-parallel to the first pivot axis, the operating lever operates the shift operating unit to rotate the cable take-up member in response to operation of the operating lever about the second pivot axis.

8. A bicycle component operating device comprising:
a base member including a first end with a bicycle mounting structure, a second end spaced from the first end, a top surface extending between the first end and the second end, a bottom surface being opposite to the top surface, a pair of oppositely facing lateral surfaces extending between the top and bottom surfaces, an insertion opening being provided on one of the top and bottom surfaces to provide access to an interior space within the base member;
an operating lever pivotally mounted on the base member about a first pivot axis extending transverse to the lateral surfaces; and
an operating unit disposed in the interior space of the base member and having a dimension relative to the insertion opening such that the operating unit is insertable into the interior space of the base member through the insertion opening, the operating unit including a shift axle having a first axle end and a second axle end, the first axle end of the shift axle facing the first end of the base member and being coupled to the base member, the second axle end of the shift axle facing the second end of the base member and being supported by a hanger that is attached to the base member,
the base member being configured such that the insertion opening continuously extends from the first pivot axis toward the first end and the second end with respect to the first pivot axis.

9. The bicycle component operating device according to claim 8, where
the hanger is attached to the base member by a first fastener attached to the base member on a first side of the hanger with respect to a longitudinal direction of the base member and by a second fastener attached to the base member on a second side of the hanger with respect to the longitudinal direction of the base member.

10. The bicycle component operating device according to claim 8, wherein
the operating unit is not supported by the base member between a rear interior surface of the first end of the base member that defines the interior space of the base member and the hanger in a direction toward the insertion opening.

11. The bicycle component operating device according to claim 8, wherein.
the first axle end of the shift axle is detachably secured to the first end of the base member by a fastening element.

12. The bicycle component operating device according to claim 11, wherein
the insertion opening has a dimension in a longitudinal direction of the base member that at least equal to an axial length of the shift axle such that the operating unit is insertable into the interior space of the base member through the insertion opening in a direction perpendicular to the shift axle in an installed position.

13. The bicycle component operating device according to claim 8, wherein
the operating unit is a shift operating unit that includes a cable take-up member.

14. The bicycle component operating device according to claim 13, wherein
the operating lever is further pivotally mounted relative to the base member to pivot about a second pivot axis that is non-parallel to the first pivot axis, the operating lever operates the shift operating unit to rotate the cable take-up member in response to operation of the operating lever about the second pivot axis.

15. A bicycle component operating device comprisitig:
a base member including a first end with a bicycle mounting structure, a second end spaced from the first end, a top surface extending between the first end and the second end, a bottom surface being opposite to the top surface, a pair of oppositely facing lateral surfaces extending between the top and bottom surfaces, an insertion opening being provided on one of the top and bottom surfaces to provide access to an interior space within the base member;
an operating lever pivotally mounted on the base member about a first pivot axis extending transverse to the lateral surfaces; and
an operating unit disposed in the interior space of the base member and having a dimension relative to the insertion opening such that the operating unit is insertable into the interior space of the base member through the insertion opening, the operating unit being secured to the base member with the operating unit remaining stationary with respect to the base member as the operating lever pivots with respect to the base member from a rest position to a braking position during a braking operation,
the base member being configured such that the insertion opening continuously extends from the first pivot axis toward the first end and the second end with respect to the first pivot axis.

16. The bicycle component operating device according to claim 15, wherein
the operating unit is a shift operating unit that includes a cable take-up member.

17. The bicycle component operating device according to claim 16, wherein
the operating lever is further pivotally mounted relative to the base member to pivot about a second pivot axis that is non-parallel to the first pivot axis, the operating lever operates the shift operating unit to rotate the cable take-up member in response to operation of the operating lever about the second pivot axis.

* * * * *